(12) United States Patent
Matus et al.

(10) Patent No.: US 10,278,039 B1
(45) Date of Patent: Apr. 30, 2019

(54) SYSTEM AND METHOD FOR VEHICLE SENSING AND ANALYSIS

(71) Applicant: Zendrive, Inc., San Francisco, CA (US)

(72) Inventors: Jonathan Matus, San Francisco, CA (US); Pankaj Risbood, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 0 days.

(21) Appl. No.: 16/201,955

(22) Filed: Nov. 27, 2018

Related U.S. Application Data

(60) Provisional application No. 62/679,497, filed on Jun. 1, 2018, provisional application No. 62/590,945, filed on Nov. 27, 2017.

(51) Int. Cl.
| | |
|---|---|
| *H04W 4/40* | (2018.01) |
| *G01C 21/20* | (2006.01) |
| *G01S 19/51* | (2010.01) |
| *H04W 4/38* | (2018.01) |
| *H04W 4/021* | (2018.01) |

(52) U.S. Cl.
CPC .............. *H04W 4/40* (2018.02); *G01C 21/20* (2013.01); *G01S 19/51* (2013.01); *H04W 4/021* (2013.01); *H04W 4/38* (2018.02)

(58) Field of Classification Search
CPC ......... H04W 4/40; H04W 4/021; H04W 4/38; G01C 21/20
See application file for complete search history.

(56) References Cited

U.S. PATENT DOCUMENTS

| | | | |
|---|---|---|---|
| 5,673,039 | A | 9/1997 | Pietzsch et al. |
| 6,049,778 | A | 4/2000 | Walker et al. |
| 6,055,477 | A | 4/2000 | McBurney et al. |
| 6,826,477 | B2 | 11/2004 | Ladetto et al. |
| 6,941,222 | B2 | 9/2005 | Yano et al. |
| 7,065,449 | B2 | 6/2006 | Brewster et al. |
| 7,532,196 | B2 | 5/2009 | Hinckley |
| 7,668,931 | B2 | 2/2010 | Parupudi et al. |
| 7,801,675 | B2 | 9/2010 | Currie et al. |
| 7,881,868 | B2 | 2/2011 | Greene et al. |

(Continued)

FOREIGN PATENT DOCUMENTS

| | | |
|---|---|---|
| DE | 3439000 A1 | 4/1986 |
| DE | 102008008555 | 8/2008 |

(Continued)

OTHER PUBLICATIONS

Kalra, Nidhi, "Analyzing Driving and Road Events via Smartphone", International Journal of Computer Applications (0975-8887), vol. 98—No. 12, Jul. 2014, pp. 5-9.

(Continued)

*Primary Examiner* — Mary Cheung
(74) *Attorney, Agent, or Firm* — Jeffrey Schox; Keith Loebner

(57) ABSTRACT

A method for monitoring vehicle motion using a mobile device associated with a user including collecting activity data at a mobile device associated with the user; determining a user activity state based on the activity data; determining motion data collection parameters associated with an operating state of the mobile device, based on the user activity state; and collecting motion data at the mobile device based on the motion data collection parameters.

20 Claims, 4 Drawing Sheets

(56) References Cited

U.S. PATENT DOCUMENTS

| | | | |
|---|---|---|---|
| 8,054,168 B2 | 11/2011 | McCormick et al. | |
| 8,264,375 B2 | 9/2012 | Devries | |
| 8,326,257 B2 | 12/2012 | Shiu et al. | |
| 8,352,189 B2 | 1/2013 | Scott et al. | |
| 8,369,876 B2 | 2/2013 | Bachmann et al. | |
| 8,395,542 B2 | 3/2013 | Scherzinger et al. | |
| 8,489,330 B2 | 7/2013 | Ellanti et al. | |
| 8,498,610 B2 | 7/2013 | Staehlin | |
| 8,504,035 B2 | 8/2013 | Shin et al. | |
| 8,521,193 B2 | 8/2013 | Paek et al. | |
| 8,577,703 B2 | 11/2013 | McClellan et al. | |
| 8,634,822 B2 | 1/2014 | Silver et al. | |
| 8,754,766 B2 | 6/2014 | Oesterling et al. | |
| 8,912,103 B2 | 12/2014 | Heo et al. | |
| 8,971,927 B2 | 3/2015 | Zhou et al. | |
| 8,972,103 B2 | 3/2015 | Elwart et al. | |
| 8,996,234 B1 * | 3/2015 | Tamari | G07C 5/0808 701/29.3 |
| 9,064,412 B2 | 6/2015 | Baur | |
| 9,121,940 B2 | 9/2015 | Psiaki et al. | |
| 9,141,974 B2 | 9/2015 | Jones et al. | |
| 9,185,526 B2 | 11/2015 | Guba et al. | |
| 9,188,451 B2 | 11/2015 | Magnusson et al. | |
| 9,221,428 B2 | 12/2015 | Kote et al. | |
| 9,222,798 B2 | 12/2015 | Curtis et al. | |
| 9,250,090 B2 | 2/2016 | Hille et al. | |
| 9,311,211 B2 | 4/2016 | Chatterjee et al. | |
| 9,311,271 B2 | 4/2016 | Wright | |
| 9,360,323 B2 | 6/2016 | Grokop | |
| 9,368,027 B2 | 6/2016 | Jang et al. | |
| 9,390,625 B2 | 7/2016 | Green et al. | |
| 9,423,318 B2 | 8/2016 | Liu et al. | |
| 9,467,515 B1 | 10/2016 | Penilla et al. | |
| 9,495,601 B2 | 11/2016 | Hansen | |
| 9,536,428 B1 | 1/2017 | Wasserman | |
| 9,558,520 B2 | 1/2017 | Peak et al. | |
| 9,566,981 B2 | 2/2017 | Rebhan et al. | |
| 9,628,975 B1 | 4/2017 | Watkins et al. | |
| 9,633,487 B2 | 4/2017 | Wright | |
| 9,645,970 B2 | 5/2017 | Boesch et al. | |
| 9,674,370 B2 | 6/2017 | Kim et al. | |
| 9,689,698 B2 | 6/2017 | Wesselius et al. | |
| 9,716,978 B2 | 7/2017 | Sankaran | |
| 9,731,713 B2 | 8/2017 | Horii | |
| 9,773,281 B1 | 9/2017 | Hanson | |
| 9,794,729 B2 | 10/2017 | Meyers et al. | |
| 9,800,716 B2 | 10/2017 | Abramson et al. | |
| 9,801,027 B2 | 10/2017 | Levy et al. | |
| 9,805,601 B1 | 10/2017 | Fields et al. | |
| 9,818,239 B2 | 11/2017 | Pal et al. | |
| 9,842,120 B1 * | 12/2017 | Siris | H04W 4/02 |
| 9,852,475 B1 | 12/2017 | Konrardy et al. | |
| 9,854,396 B2 | 12/2017 | Himmelreich et al. | |
| 9,868,394 B1 | 1/2018 | Fields et al. | |
| 9,870,649 B1 | 1/2018 | Fields et al. | |
| 2002/0161517 A1 | 10/2002 | Yano et al. | |
| 2003/0018430 A1 | 1/2003 | Ladetto et al. | |
| 2004/0082311 A1 | 4/2004 | Shiu et al. | |
| 2005/0080555 A1 | 4/2005 | Parupudi et al. | |
| 2005/0093868 A1 | 5/2005 | Hinckley | |
| 2005/0197773 A1 | 9/2005 | Brewster et al. | |
| 2006/0153198 A1 | 7/2006 | Chadha | |
| 2007/0005228 A1 | 1/2007 | Sutardja | |
| 2007/0208494 A1 | 9/2007 | Chapman et al. | |
| 2007/0208501 A1 | 9/2007 | Downs et al. | |
| 2008/0033776 A1 | 2/2008 | Marchese | |
| 2008/0103907 A1 | 5/2008 | Maislos et al. | |
| 2008/0243439 A1 | 10/2008 | Runkle et al. | |
| 2008/0312832 A1 | 12/2008 | Greene et al. | |
| 2009/0024419 A1 | 1/2009 | McClellan et al. | |
| 2010/0056175 A1 | 3/2010 | Bachmann et al. | |
| 2010/0100398 A1 | 4/2010 | Auker et al. | |
| 2010/0106406 A1 | 4/2010 | Hille et al. | |
| 2010/0198517 A1 | 8/2010 | Scott et al. | |
| 2010/0219944 A1 | 9/2010 | Mc et al. | |
| 2010/0273508 A1 | 10/2010 | Parata et al. | |
| 2010/0299021 A1 | 11/2010 | Jalili | |
| 2011/0077028 A1 | 3/2011 | Wilkes et al. | |
| 2011/0124311 A1 | 5/2011 | Staehlin | |
| 2011/0161116 A1 | 6/2011 | Peak et al. | |
| 2011/0246156 A1 | 10/2011 | Zecha et al. | |
| 2011/0294520 A1 | 12/2011 | Zhou et al. | |
| 2012/0050095 A1 | 3/2012 | Scherzinger et al. | |
| 2012/0066053 A1 | 3/2012 | Agarwal | |
| 2012/0089328 A1 | 4/2012 | Ellanti et al. | |
| 2012/0136529 A1 | 5/2012 | Curtis et al. | |
| 2012/0149400 A1 | 6/2012 | Paek et al. | |
| 2012/0197587 A1 | 8/2012 | Luk et al. | |
| 2012/0226421 A1 | 9/2012 | Kote et al. | |
| 2012/0245963 A1 | 9/2012 | Peak et al. | |
| 2013/0006469 A1 | 1/2013 | Green et al. | |
| 2013/0041521 A1 | 2/2013 | Basir et al. | |
| 2013/0052614 A1 | 2/2013 | Mollicone et al. | |
| 2013/0069802 A1 | 3/2013 | Foghel et al. | |
| 2013/0096731 A1 | 4/2013 | Tamari et al. | |
| 2013/0130639 A1 | 5/2013 | Oesterling et al. | |
| 2013/0211618 A1 | 8/2013 | Iachini | |
| 2013/0302758 A1 | 11/2013 | Wright | |
| 2013/0316737 A1 | 11/2013 | Guba et al. | |
| 2013/0317860 A1 | 11/2013 | Schumann | |
| 2013/0325517 A1 | 12/2013 | Berg | |
| 2013/0332357 A1 | 12/2013 | Green et al. | |
| 2013/0344856 A1 | 12/2013 | Silver et al. | |
| 2014/0038640 A1 | 2/2014 | Wesselius et al. | |
| 2014/0046896 A1 | 2/2014 | Potter | |
| 2014/0081670 A1 | 3/2014 | Lim et al. | |
| 2014/0188638 A1 | 7/2014 | Jones et al. | |
| 2014/0232592 A1 | 8/2014 | Psiaki et al. | |
| 2014/0244150 A1 | 8/2014 | Boesch et al. | |
| 2014/0244156 A1 | 8/2014 | Magnusson et al. | |
| 2014/0288765 A1 | 9/2014 | Elwart et al. | |
| 2014/0358394 A1 | 12/2014 | Picciotti | |
| 2015/0025917 A1 | 1/2015 | Stempora | |
| 2015/0084757 A1 | 3/2015 | Annibale et al. | |
| 2015/0097703 A1 | 4/2015 | Baur | |
| 2015/0229666 A1 | 8/2015 | Foster et al. | |
| 2015/0233718 A1 | 8/2015 | Grokop | |
| 2015/0246654 A1 | 9/2015 | Tadic et al. | |
| 2015/0332407 A1 | 11/2015 | Wilson et al. | |
| 2015/0334545 A1 | 11/2015 | Maier et al. | |
| 2016/0033366 A1 | 2/2016 | Liu et al. | |
| 2016/0042767 A1 | 2/2016 | Araya et al. | |
| 2016/0048399 A1 | 2/2016 | Shaw | |
| 2016/0059855 A1 | 3/2016 | Rebhan et al. | |
| 2016/0068156 A1 | 3/2016 | Horii | |
| 2016/0086285 A1 | 3/2016 | Jordan et al. | |
| 2016/0171521 A1 | 6/2016 | Ramirez et al. | |
| 2016/0174049 A1 | 6/2016 | Levy et al. | |
| 2016/0189442 A1 | 6/2016 | Wright | |
| 2016/0225263 A1 | 8/2016 | Salentiny et al. | |
| 2016/0232785 A1 | 8/2016 | Wang | |
| 2016/0269852 A1 | 9/2016 | Meyers et al. | |
| 2016/0272140 A1 | 9/2016 | Kim et al. | |
| 2016/0325756 A1 | 11/2016 | Cordova et al. | |
| 2016/0328893 A1 | 11/2016 | Cordova et al. | |
| 2016/0379310 A1 | 12/2016 | Madigan et al. | |
| 2016/0379485 A1 | 12/2016 | Anastassov et al. | |
| 2016/0381505 A1 | 12/2016 | Sankaran | |
| 2017/0053461 A1 | 2/2017 | Pal et al. | |
| 2017/0097243 A1 | 4/2017 | Ricci | |
| 2017/0103342 A1 | 4/2017 | Rajani et al. | |
| 2017/0103588 A1 | 4/2017 | Rajani et al. | |
| 2017/0115125 A1 | 4/2017 | Outwater et al. | |
| 2017/0126810 A1 | 5/2017 | Kentley et al. | |
| 2017/0138737 A1 | 5/2017 | Cordova et al. | |
| 2017/0164158 A1 | 6/2017 | Watkins et al. | |
| 2017/0178416 A1 | 6/2017 | Barreira Avegliano et al. | |
| 2017/0178422 A1 | 6/2017 | Wright | |
| 2017/0178424 A1 | 6/2017 | Wright | |
| 2017/0210323 A1 | 7/2017 | Cordova et al. | |
| 2017/0211939 A1 | 7/2017 | Cordova et al. | |
| 2017/0234689 A1 | 8/2017 | Gibson et al. | |
| 2017/0279947 A1 | 9/2017 | Rajakarunanayake et al. | |
| 2017/0289754 A1 * | 10/2017 | Anderson | H04W 4/04 |

(56) References Cited

U.S. PATENT DOCUMENTS

| | | |
|---|---|---|
| 2017/0371608 A1 | 12/2017 | Wasserman |
| 2018/0154908 A1* | 6/2018 | Chen ................ B60R 25/102 |
| 2018/0174446 A1 | 6/2018 | Wang |
| 2019/0007511 A1* | 1/2019 | Rodriguez ............ H04L 67/26 |

FOREIGN PATENT DOCUMENTS

| | | |
|---|---|---|
| EP | 0534892 A1 | 3/1993 |
| GB | 2492369 B | 4/2014 |
| KR | 20130106106 A | 9/2013 |
| WO | 2004085220 | 10/2004 |

OTHER PUBLICATIONS

Das Tathagata; et al."PRISM: Platform for Remote Sensing using Smartphones," In. Proc. Mobisys '10, Jun. 15-18, 2010, San Francisco, USA, pp. 63-76.

Mohan Prashanth; et al. Nericell: Rich Monitoring of Road and Traffic Conditions using Mobile Smartphones, SenSys '08, Nov. 5-7, 2008, Raleigh, North Carolina.

Giuseppe, Guido, et al., "Using Smartphones as a Tool to Capture Road Traffic Attributes", University of Calabria, Department of Civil Engineering, via P.Bucci, 87036—Rende (CS) Italy, Applied Mechanics and Materials, vol. 432 2013, Trans Tech Publications, Switzerland, pp. 513-519.

* cited by examiner

SYSTEM AND METHOD FOR VEHICLE SENSING AND ANALYSIS

CROSS-REFERENCE TO RELATED APPLICATIONS

This application claims the benefit of U.S. Provisional Application Ser. No. 62/679,497, filed 1 Jun. 2018, and U.S. Provisional Application Ser. No. 62/590,945, filed 27 Nov. 2017, each of which is incorporated herein in its entirety by this reference.

TECHNICAL FIELD

This invention relates generally to the vehicular activity monitoring field, and more specifically to a new and useful system and method for monitoring vehicle-related user activity and vehicle motion in the vehicular activity monitoring field.

BACKGROUND

In order to monitor and understand driving behavior using mobile phone sensor data, it is often necessary to accurately determine whether the vehicle is being driven (e.g., to detect start of driving accurately, to collect data for entire duration of drive, etc.). However, it is important to do this both accurately and efficiently (e.g., while minimizing battery consumption, wasted computational effort, etc.) given various alternative uses and onboard power limitations of mobile devices.

Thus, there is a need in the vehicle monitoring field to create a new and useful system and method for monitoring vehicle motion using a mobile device. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
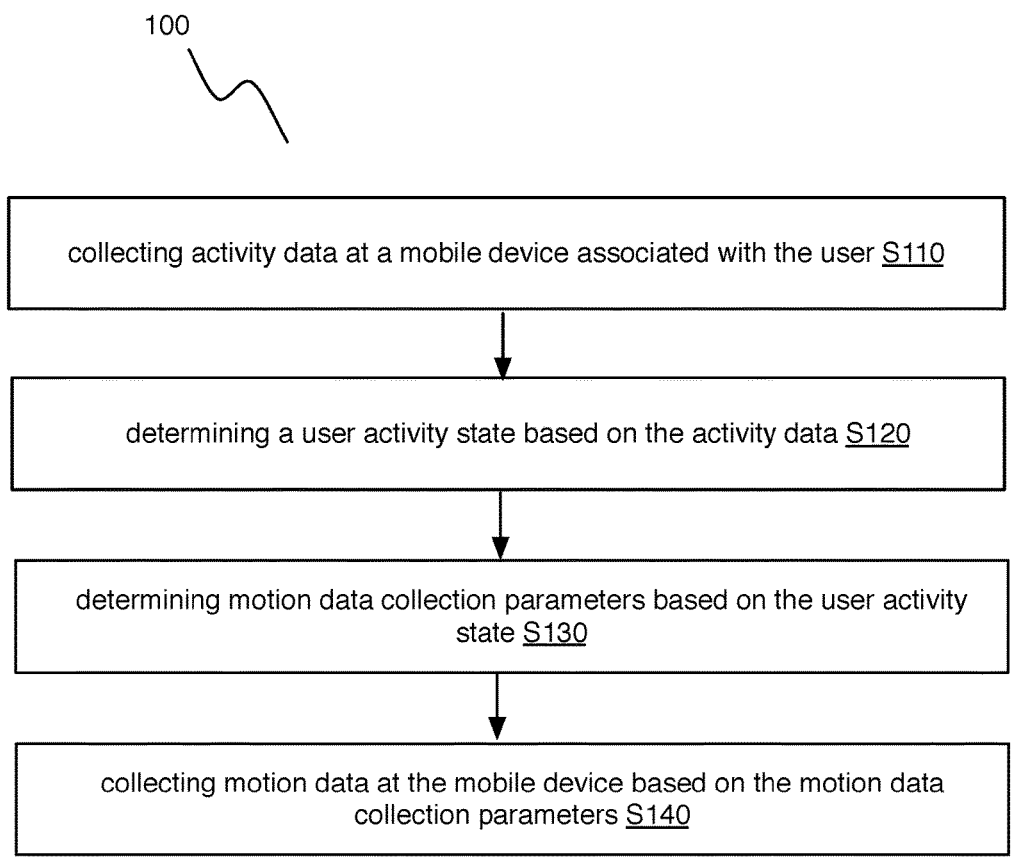
FIG. 1 is a flowchart depiction of a method for monitoring vehicle motion using a mobile device.

As shown in FIG. 1, a method 110 for monitoring vehicle motion includes: collecting activity data at a mobile device associated with the user S110; determining a user activity state based on the activity data S120; determining motion data collection parameters based on the user activity state S130; and collecting motion data at the mobile device based on the motion data collection parameters S140. The method 100 can additionally include: generating an analysis of collected data S150; and transmitting a communication based on an analysis S160.

Figure 2:
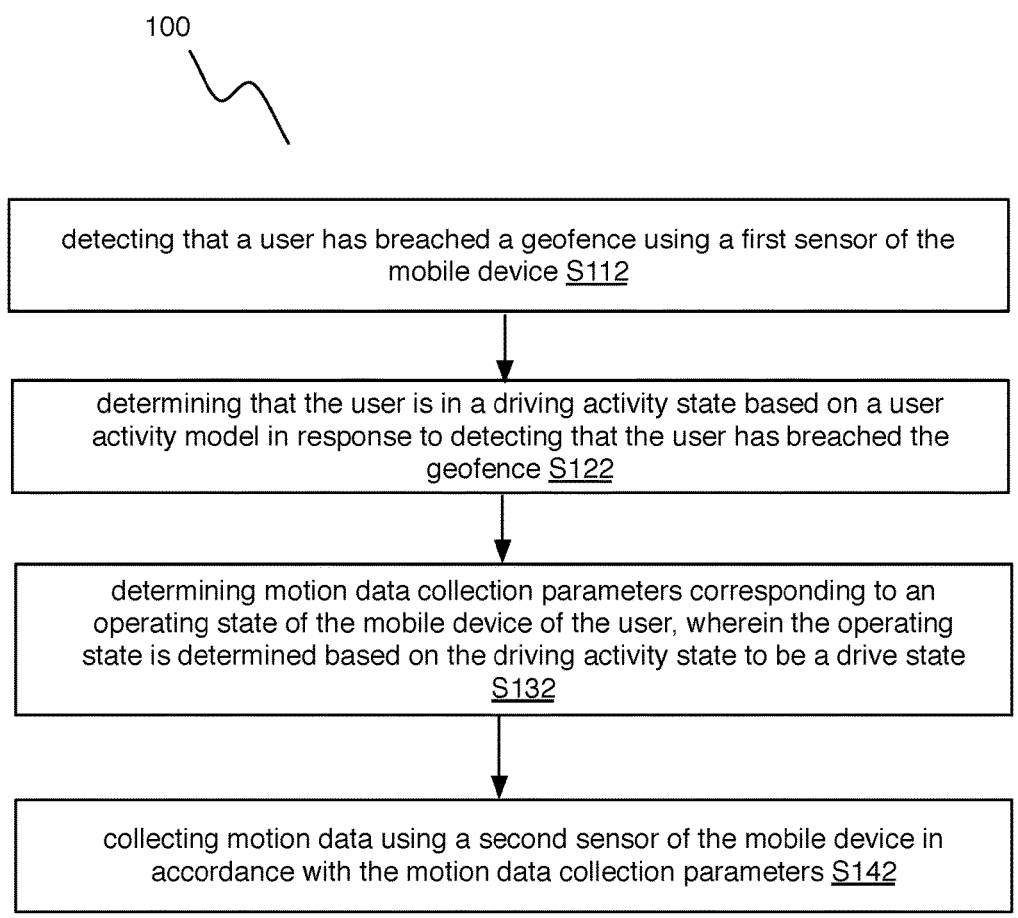
FIG. 2 is a flowchart depiction of a variation of a method for monitoring vehicle motion using a mobile device.

In one variation, as shown in FIG. 2, the method 100 for monitoring vehicle motion includes: detecting that a user has breached a geofence using a first sensor of the mobile device S112; determining that the user is in a driving activity state based on a user activity model in response to detecting that the user has breached the geofence S122; determining motion data collection parameters corresponding to an operating state of the mobile device of the user, wherein the operating state is determined, based on the driving activity state, to be a drive state S132; and collecting motion data using a second sensor of the mobile device in accordance with the motion data collection parameters S142.

Figure 4:
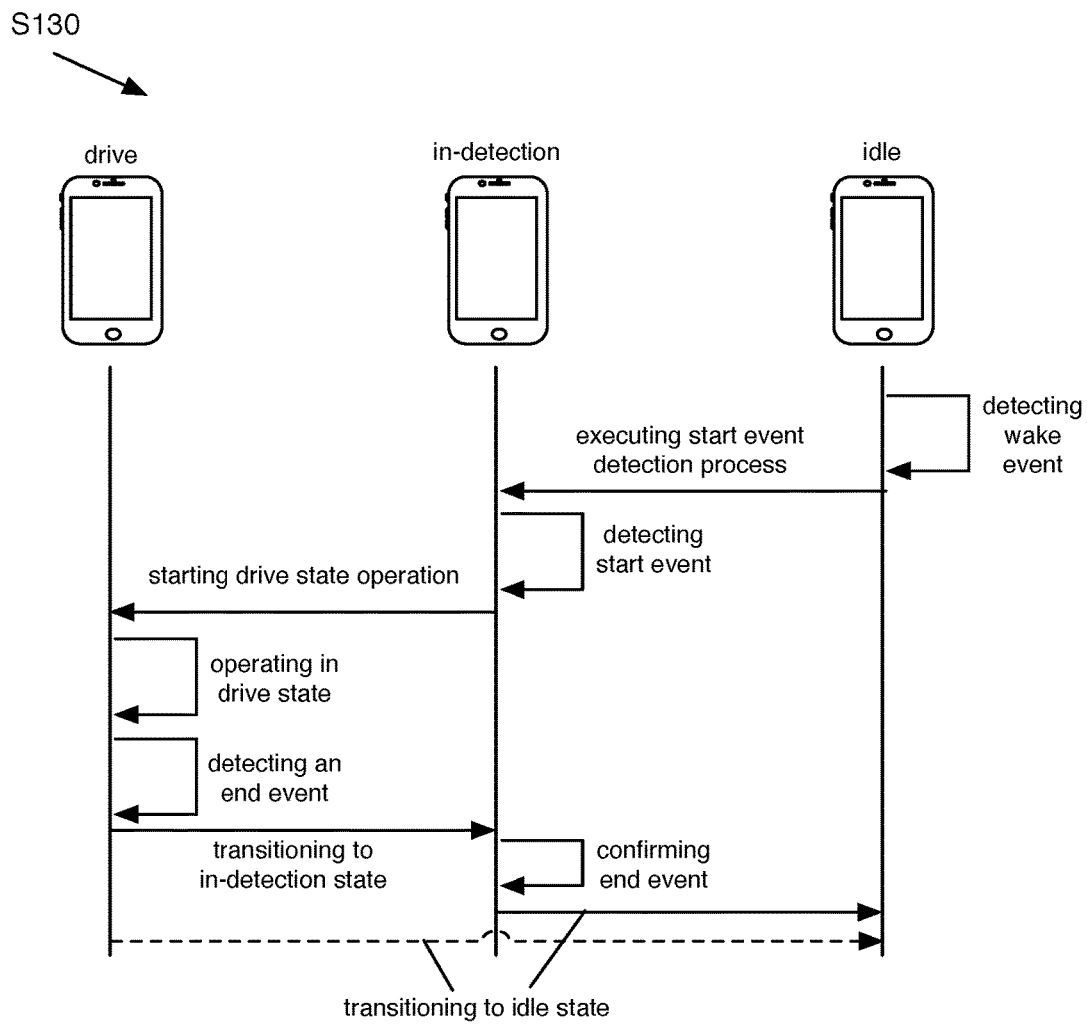
FIG. 4 is a flowchart depiction of a variation of a method for monitoring vehicle motion using a mobile device.

In a second variation, as shown in FIG. 4, the method can include: detecting a wake event in an idle state (e.g., Block 110; operating in an idle state); executing a start event detection process in response to detecting the wake event; detecting a start event using the start event detection process (e.g., Block S122; operating in an in-detection state); executing a drive analysis process in response to start event detection (e.g., Block S132; starting drive state operation); executing an end detection process when the drive analysis process is executed (e.g., before, after, or in parallel with the drive analysis process), and operating in the idle state in response to detection of an end event by the end detection process.

The method 100 can also include analyzing the motion data and extracting a set of vehicle movement characteristics S152, and transmitting a notification to a remote entity based on at least one of the extracted vehicle movement characteristics exceeding a threshold value of a vehicle motion parameter S162.

In specific examples, the method 100 can include any of the processes and/or blocks substantially as described in U.S. application Ser. No. 14/206,721, entitled "System and Method for Determining A Driver in A Telematic Application" and filed 12 Mar. 2014, which is incorporated herein in its entirety by this reference. However, the method 100 can additionally or alternatively include any other suitable blocks and/or processes.

The method 100 functions to enable the accurate detection of the start of a driving session (e.g., driving activity) and collect movement data for the duration of the driving session at a mobile device of the user, while minimizing power consumption of the mobile device (e.g., due to data collection). The method 100 can also function to enable time-efficient and power-efficient collection of vehicle position, velocity, and acceleration (PVA) data. The method 100 can also function to enable accurate and rapid detection of supplementary data (e.g., audio data, vehicle sensor data, etc.).

The method 100 is preferably implemented on a mobile electronic device (e.g., the mobile electronic device of Block S140) removably coupled to a vehicle and/or user (e.g., a smartphone carried inside a car, a smartphone carried by a user); the method 100 may additionally or alternatively be implemented by any electronic device capable of collecting user activity data and vehicle PVA data, and/or a collection of electronic devices in mutual communication and collectively capable of collecting user activity data and vehicle PVA data. The mobile electronic device(s) may be referred to as a mobile device and/or a navigation device. The method is preferably performed by a client or application, but can be performed by a piece of hardware (e.g., an ASIC) or any suitable system. The client preferably runs on a mobile device, but can alternatively run on any other suitable computing system. The client can be a native application, a browser application, an operating system application, or be any other suitable application or executable.

The vehicle to which the mobile electronic device is removably coupled, and in the context of which variations of the method 100 can be implemented, can be an automotive vehicle (e.g., a car, truck, SUV, etc.), a light electric vehicle (e.g., an electric bike, an electric scooter, an electric skateboard, any other suitable electric vehicle that is configured to carry at least one human, etc.), an aerial vehicle (e.g., a fixed wing aircraft, a rotary wing aircraft, a drone, a hovercraft, etc.), a mass transit land vehicle (e.g., a bus, a locomotive train, a light-rail train, etc.), an aquatic vehicle (e.g., a pleasure craft, a ferry, a hydrofoil craft, etc.), and/or any other suitable vehicle.

2. Benefits

Variations of the method can afford various benefits and/or advantages.

First, the technology can leverage non-generic location data (e.g., location datasets, GPS data, beacon data, etc.) and/or motion data (e.g., motion datasets, accelerometer data, gyroscope data, etc.) to conveniently and unobtrusively determine the beginning of a driving session, vehicle motion characteristics during the driving session, and the conclusion of the driving session (e.g., to facilitate data collection during the time of the driving session but not outside the time of the driving session). In examples, the location data and/or motion data can be passively collected at a user's mobile computing device (e.g., a smartphone, a tablet, etc.), such that the technology can perform driving event determination and/or receive driving-related communications without requiring a user to purchase additional hardware (e.g., a specialized onboard device for monitoring traffic-related events, a purpose-built such device, etc.) or for the user to manually indicate the beginning and/or end of a driving session.

Second, the technology can automatically initiate collection of driving data (e.g., movement datasets associated with a driving session), and analyses that result in performance of traffic-related actions (e.g., actions relating to driving on a roadway, in traffic-related scenarios, etc.). Traffic-related actions can include any one or more of controlling the user device, sending a notification to the user or a related entity, generating user-specific content, and/or other suitable user-related actions. Traffic-related actions can additionally or alternatively include controlling the vehicle or subsystems of the vehicle (e.g., brakes, throttle, signals, lights, steering, HVAC, audio-visual, etc.), generating control instructions (e.g., auditory instructions, visual instructions, etc.) for provision to a driver, and/or other suitable control-related actions. Further, in examples, the type of initiated traffic-related action can be tailored to the particular traffic-related communication or event based on movement data (e.g., motion data, location data, etc.) and/or supplemental data. In examples, the technology can include a software development kit for third-parties to integrate the traffic-related communication features into various applications, thereby enabling third-parties to leverage traffic-related event data that is automatically determined and/or communicated in relevant geographic areas for purposes of driving education, ride sharing, valet services, navigation, roadside assistance, insurance processing, emergency services, autonomous vehicle control, advanced driver assistance system operation, and/or other suitable services and applications.

Third, the technology can improve the technical fields of at least vehicle telematics, inter-vehicle networked communication, computational modeling of traffic-related events, and traffic-related event determination with mobile computing device data. The technology can continuously collect and utilize non-generic sensor data (e.g., location sensor data, motion sensor data, GPS data, audio/visual data, ambient light data, etc.) to provide real-time determination of traffic-related events and communication of those events to potentially affected entities. Further, the technology can take advantage of the non-generic sensor data and/or supplemental data (e.g., vehicle sensor data, weather data, traffic data, environmental data, biosignal sensor data, etc.) to better improve the understanding of correlations between such data and traffic-related events and/or responses to such events, leading to an increased understanding of variables affecting user behavior while driving and/or riding in a vehicle and/or traffic behavior at the scale of a population of users driving vehicles.

Fourth, the technology can provide technical solutions necessarily rooted in computer technology (e.g., automatic data collection via a mobile computing platform, utilizing computational models to determine traffic-related events from non-generic movement datasets and/or supplementary datasets collected at mobile computing devices, updating the computational models based on event determination and/or communication accuracy, etc.) to overcome issues specifically arising with computer technology (e.g., issues surrounding how to leverage movement data collected by a mobile computing device to determine traffic-related events, how to automatically communicate traffic-related information to initiate traffic-related actions for responding to traffic-related characterization, etc.).

Fifth, the technology can leverage specialized computing devices (e.g., computing devices with GPS location capabilities, computing devices with motion sensor functionality, wireless network infrastructure nodes capable of performing edge computation, etc.) to collect specialized datasets for characterizing traffic behaviors executed by the vehicle (e.g., under the influence of the driver's control, when controlled by an autonomous control system, etc.).

Sixth, the technology can enable prompt collision detection (e.g., substantially as described in U.S. application Ser. No. 15/727,972, filed 9 Oct. 2017, which is incorporated herein in its entirety by this reference), and communication of the collision to relevant entities (e.g., potentially affected vehicles by transmitting a traffic-related communication to mobile devices within those vehicles, an insurance-related entity by transmitting an FNOL to the entity, etc.).

However, the method 100 and/or variations thereof can additionally or alternatively afford any suitable benefits.

3. Method

As shown in FIG. 1, a method 100 for monitoring vehicle motion includes: collecting activity data at a mobile device associated with the user S110; determining a user activity state based on the activity data S120; determining motion data collection parameters based on the user activity state S130; and collecting motion data at the mobile device based on the motion data collection parameters S140. The method 100 can additionally include: generating an analysis of collected data S150; and transmitting a communication based on an analysis S160.

3.1 Collecting Activity Data

Block S110 includes collecting activity data. Activity data is preferably data that describes the activity of the user, and more preferably describes the activity of the user in relation to driving of a vehicle. For example, activity data preferably includes data indicative of whether the user is driving (e.g., actively controlling a vehicle, riding in a vehicle being actively driven, riding in a moving vehicle, etc.), about to drive (e.g., imminently, within a predetermined threshold time period such as one minute, five minutes, etc.), has stopped driving within a recent time period (e.g., five minutes, one minute, a period equivalent to a movement data collection interval, etc.), and any other suitable characteristic of user activity in relation to driving events (e.g., driving sessions).

In relation to Block S110, driving of a vehicle can include operating a motor vehicle (e.g., an automotive vehicle), using a light vehicle (e.g., a bicycle, a scooter, a skateboard, etc.) which can be powered (e.g., electric powered, gas powered, etc.) and/or unpowered (e.g., human powered, pedaled, etc.), operating any other suitable vehicle as described above, and/or performing any other suitable actions associated with control of a vehicle.

In relation to Block S110, activity data preferably includes movement data (e.g., accelerometer data collected at a sensor of the mobile device of the user) and supplementary data (e.g., contextual data collected in association with the movement data). Supplementary data is preferably data that can be used in combination with, to filter, to control for errors in, and/or otherwise supplement movement data in order to determine user activity (e.g., in Block S120). Additionally or alternatively, supplementary data can be used by portions of the method 100 in a manner independent of movement data. Supplementary data can include any one or more of: user data (e.g., indicative of user information describing one or more characteristics of one or more users and/or associated devices, etc.), audio data (e.g., audio recorded by a plurality of mobile devices; audio associated with a phone call; associated with conversations which can indicate that a user is intending to imminently begin a driving session or is starting a trip; environmental audio; vehicular audio, such as engine audio; etc.), optical data (e.g., imagery; video; internal vehicle-facing optical data of users operating a vehicle; external vehicle-facing optical data of route, landmarks, geographical markers, and/or the speed at which such objects are passing by the optical sensor; optical data capturing users entering or exiting the vehicle, such as from the driver side or passenger side; mobile device camera data; etc.), vehicle data (e.g., vehicle proximity sensor data; OBD data; vehicle operation data; vehicle camera data; PVA data; fuel data; motion sensor data; etc.), traffic data (e.g., route data, which can be used to determine that the mobile device is in a vehicle and/or traversing vehicle-only routes; type of vehicular path such as freeway road or local road; etc.), biometric data (e.g., cardiovascular parameters, such as heart rate, which can be indicative of user driving behavior in response to different traffic conditions; sleep metrics; respiration data; biological fluid data; etc.), environmental data (e.g., weather conditions, which can be correlated with frequency of a particular user to operate a vehicle during such weather conditions; road conditions; pressure conditions; air quality; etc.), and/or any other suitable data for facilitating determination of user activity states, vehicle movement characteristics, and/or other suitable data.

Relating to Block S110, user activity data (e.g., user activity datasets) can include any one or more of: device datasets (e.g., describing devices associated with the user; historical pairings and/or communications with other devices, such as vehicles and/or other user devices via Bluetooth or other communication protocols; etc.); behavioral datasets (e.g., behavior data upon which user activity models can be based or generated for users and/or user accounts; social media datasets derived from social media actions taken by the user and/or related to the user, which can indicate user activity states corresponding to social media actions; physical activity datasets associated with movement patterns of the user; etc.); demographic datasets (e.g., nationality, ethnicity, age, gender, etc.); device event datasets (e.g., associated with text messaging; phone calling; device idling; device charging; application usage; sensor usage; intelligent personal assistants; outputs such as media casting; inputs; etc.), and/or any other suitable datasets associated with a user. Vehicle data can include any one or more of: proximity sensor data (e.g., radar, electromagnetic sensor data, ultrasonic sensor data, light detection and ranging, light amplification for detection and ranging, line laser scanner, laser detection and ranging, airborne laser swath mapping, laser altimetry, sonar, etc.), vehicle camera data (e.g., in-car cameras, exterior cameras, back-up cameras, dashboard cameras, front-view cameras, side-view cameras, image recognition data, infrared camera, 3D stereo camera, monocular camera, etc.), car speed, RPM data, odometer, altimeter, location sensor data (e.g., GPS data, compass data, etc.), motion sensor data (e.g., from an accelerometer, gyroscope, etc.), environmental data (e.g., pressure, temperature, etc.), light sensor data (e.g., from infrared sensors, ambient light sensors, etc.), fuel level (e.g., percentile-based, distance-based, low warning, etc.), fuel system status, oxygen sensor data, throttle position, gear data (e.g., drive, neutral, park, reverse, gear number, etc.), HVAC data (e.g., current temperature, target temperature, etc.), driving status (e.g., restricted features such as user inputs into control panel, unrestricted features, etc.), connectedness status (e.g., near-field communication pairing between the vehicle and a user's mobile device), and/or any other suitable vehicle data. For example, vehicle data can be used in comparisons with mobile device-derived movement data in training, updating, and/or otherwise processing computational models described herein and/or other suitable models. However, supplementary data types can be configured in any suitable manner.

Block S110 preferably includes collecting user activity data at devices used in collecting movement data (e.g., a mobile device associated with the user), but can additionally or alternatively include collecting user activity data at a distinct device (e.g., another mobile device, medical device, other user device, third party database, etc.). For example, Block S110 can include collecting device event data (e.g., application usage, locks, unlocks, etc.) from a mobile device during a time period in which movement data from the mobile device is being collected. In another example, Block S110 can include collecting first supplementary data of a first type (e.g., device event data) from a first mobile device (e.g., where the corresponding user has permitted such data collection, etc.) during a time period; and collecting second supplementary data of a second type (e.g., audio data, etc.) from a second mobile device during the time period. However, collecting supplementary data can be performed at any suitable components associated with any suitable portions of the method 100.

Block S110 can be performed by the application (e.g., a native application executing in the background, a client, etc.); the operating system of the mobile device (e.g., iOS™, Android™); a remote computing system associated with the operating system; or by any suitable system. In variants where S110 is performed by the operating system or remote system associated with the operating system, the method can reduce additional resource consumption (e.g., battery consumption) because the underlying data is being collected and used for other processes; the application itself is minimizing or not consuming any additional resources. In one variation, Block S110 includes setting a wake condition with the mobile device operating system, wherein the mobile device operating system delivers an event (e.g., notification) to the application, launches the application, progresses to Block S120, or otherwise triggers further application operation in response to the condition being met.

In a variation, Block S110 includes Block S112, which includes detecting that a user has breached a geofence using a first sensor of the mobile device. Block S112 functions to trigger the determination of user activity (e.g., in Block S120), in response to detecting that the user has crossed a virtual barrier (e.g., geofence). Block S112 can also function to indicate (e.g., preliminarily) the user activity (e.g., wherein the user activity involves moving). The first sensor of the mobile device is preferably a location sensor (e.g., a GPS sensor subsystem) and a suitable set of hardware and/or software components for setting a geofence and determining that a geofence has been crossed (e.g., a GPS application executing on the mobile device CPU and operating system). In variants, Block S112 can function as the wake condition passed by the application to the mobile device operating system and/or be the wake condition detected by the operating system. However, the wake condition can include: user activities being classified as non-stationary (e.g., based on a subscription to operation-system logged user activity updates); user activities being classified as a predetermined activity class (e.g., motion above a velocity threshold); mobile device execution of a vehicle-associated application (e.g., a vehicle OEM or vehicle control application being launched); occurrence of an activity update (e.g., Android™ activity update) that the application has subscribed to; or be any suitable wake condition.

In relation to Block S112 and other Blocks of the method 100 including the user of a geofence, the geofence can be a static geofence (e.g., a geofence made up of a curve virtually located at a fixed position relative to a predetermined location), a dynamic geofence (e.g., a geofence that has an adjustable curve virtually located at a moveable position relative to a predetermined or dynamically determinable location), a temporally-variable geofence (e.g., a static or dynamic geofence that is monitored during a predetermined time period or schedule), and any other suitable type of virtual geographic barrier. The geofence can be a closed curve (e.g., a circle, an amorphous closed shape, a 2D footprint corresponding to a building, etc.) or an open curve (e.g., a line, an arc, a sinuous curve, a threshold corresponding to a building egress point, etc.). In some variations, the geofence can be updated periodically (e.g., continuously, with a constant period, with a speed-based period, asynchronously, and any other suitable temporal characteristics, etc.). In a specific example, the geofence is defined as a circle having a variable radius based upon the speed of the user (e.g., computed based on the distance between two sequential measured locations of the user divided by the elapsed time between the measurements of the two sequential points) and is centered at the mobile device, wherein the variable radius is determined based on the speed such that the geofence is crossed at a constant frequency (e.g., approximately constant) if the speed is held constant. In a specific example, when the wake condition includes breaching a geofence (or entering a geofence), the set geofence (e.g., the geofence set prior to meeting the wake condition, the geofence set as a result of meeting the wake condition, etc.) can be centered about the mobile device location and have a small radius (e.g., 1 m, 5 m, etc.). However, the geofence can be otherwise suitably determined and manipulated.

3.2 Determining a User Activity State

Block S120 includes determining a user activity state. Block S120 functions to discern when a user has entered a driving state (e.g., when the user is beginning to operate a vehicle, when the user will imminently be in a moving vehicle, when the user has started a ride on a light electric vehicle, etc.). Block S120 can also function to discern when a user has entered a non-driving state (e.g., has not entered a driving state, has exited a driving state, will not imminently enter a driving state, will imminently exit a driving state, etc.).

Block S120 is preferably performed at the mobile device of the user, more preferably by the application running on the mobile device (e.g., native application) but alternatively by the operating system, a browser application or other application; but can additionally or alternatively be performed and/or executed at any suitable computing system in communication with the mobile device (e.g., a remote computing system).

Determining the user activity state is preferably based on the activity data (e.g., collected in Block S110). In particular, determining the user activity state is preferably based on a user activity model that outputs the user activity state based on the input of the user activity data. However, the user activity state can be otherwise suitably determined based on the activity data (e.g., via retrieval of user activity state data correlated to the activity data from a database, via direct input or selection from a user at an application executing on the mobile device, etc.).

Figure 3:
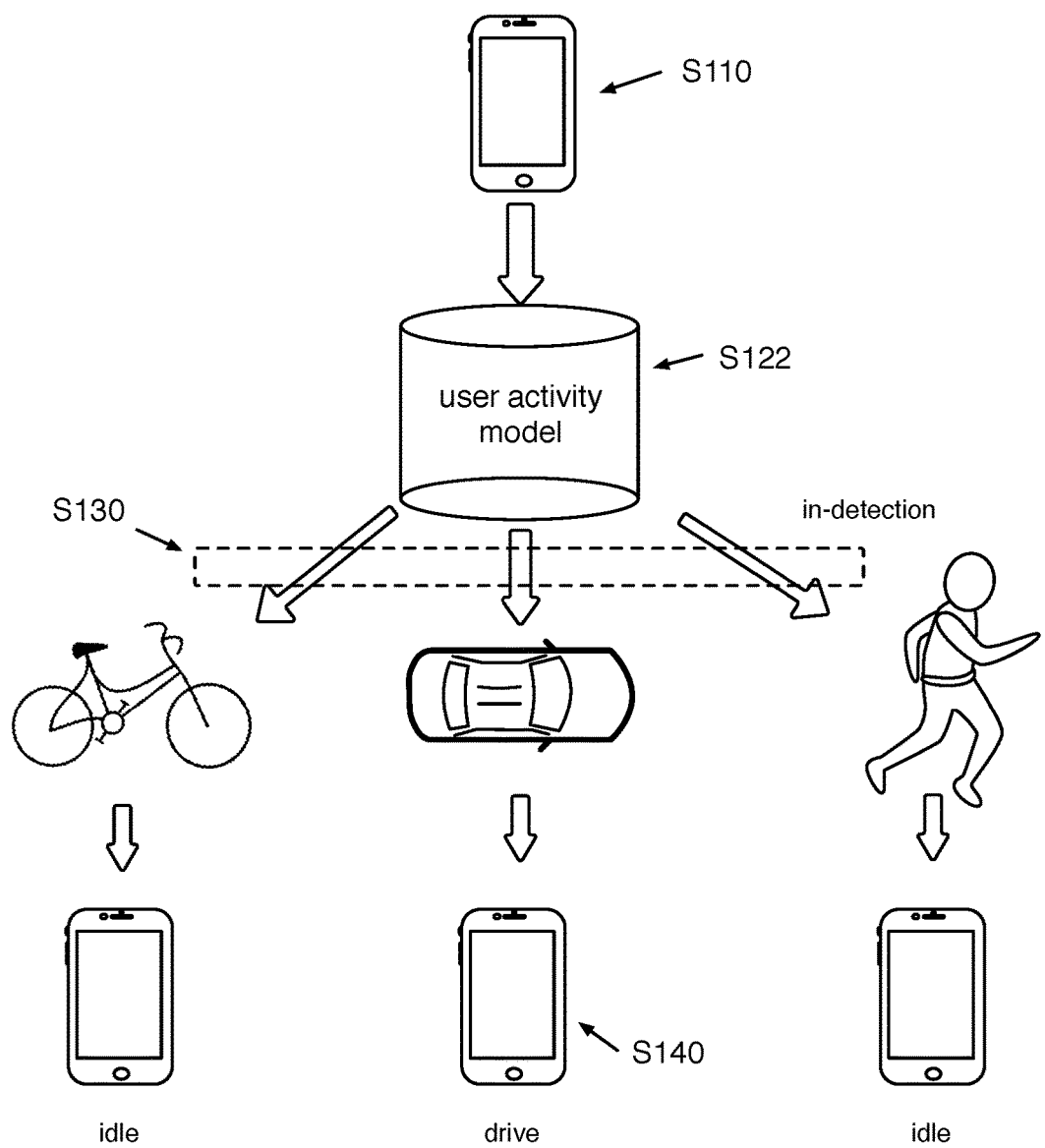
FIG. 3 is a schematic representation of an embodiment of a portion of a method for monitoring vehicle motion using a mobile device.

In a first variation, an example of which is shown in FIG. 3, Block S120 includes Block S122, which includes determining the user activity state based on a user activity model. The user activity model is preferably one of a plurality of user activity models, each of the plurality of user activity models associated with a single user activity (e.g., walking, biking, sitting, etc.); however, the user activity model can additionally or alternatively be a single multi-activity user activity model. The user activity model preferably generates the user activity state as an output and receives the activity data (e.g., as described above) as an input. The user activity models used in accordance with Block S122 preferably include a walking model, a biking model, a flying model, a resting (e.g., substantially immobile) model, and a driving model, but can additionally or alternatively include any suitable models for any suitable activity.

In specific examples, the user activity model can be a memory-based model that uses a series of activity updates (e.g., received from a mobile device operating system that determines a categorization of user activity based on user interactions with the device operating system and outputs the categorization as an activity update) accumulated over time to build the user activity model. The memory-based model can subsequently be used to categorize user activity as a particular user activity state (e.g., driving, walking to a parking lot, sitting at the user's desk, maintaining the user's ranarium, etc.). However, the user activity model can be a deterministic model, a set of rules, a model trained according to machine-learning algorithms, and any other suitable type of model.

In a first example, Block S122 includes: storing a series of condition-based queries; sending the first query of the series to the mobile device operating system and/or associated computing system in response to Block S110 occurrence; sending the next query to the computing system in response to the returned data (returned by the computing system) satisfying the condition associated with the query; and detecting a start event (e.g., drive start event) when the last query is satisfied and/or the last condition is satisfied. The condition can be activity updates (e.g., determined by an Android™ operating system) having a predetermined value, class, or other parameter value; or be any suitable condition.

In a second example, Block S122 includes accumulating activity updates (e.g., determined by the application, determined by the operating system, etc.); and detecting a start event when the pattern, combination, or other permutation of the activity updates satisfies a predetermined pattern, combination, confidence level, or other metric. However, Block 122 can be otherwise performed.

In the above examples, the series or pattern of conditions can be stored as a tree-based model, wherein each condition can be a node. However, the queries can be otherwise stored. Each parent condition or node in the tree preferably has a lower resource cost (e.g., consumes less batteries, uses sensor data that requires less processing power and/or battery power, etc.) than the child condition or node, but the tree can be structured such that the high-resource nodes are parent nodes of low-resource children nodes, structured independent of node resource requirements, or otherwise structured.

In a specific example, the tree can include, in series: detecting a geofence breach (e.g., based on sampling from the GPS module; based on a GPS event notification from an activity subscription; etc.); determining that the activity is not a non-driving event (e.g., based on sampling from the IMU, based on a walking or biking event notification from an activity subscription; etc.); verifying that a short-range radio (e.g., Bluetooth) is connected to a vehicle endpoint (e.g., wherein the vehicle endpoint can be manually tagged as a vehicle, be associated with a vehicle OEM prefix, etc.); and verifying that a mid-range radio (e.g., WiFi, ZigBee) is not connected to a mid-range endpoint (e.g., a home router), wherein the method can default to Block S110 if any of the conditions fail. If the aforementioned conditions are satisfied, the application can determine mobile device movement parameters (e.g., velocity, acceleration) by turning on sensor data (e.g., GPS and inertial sensors) and/or using other higher-powered operations. If the mobile device movement satisfies a movement condition (e.g., the velocity exceeds a predetermined threshold), then the method can run Block S130; if the movement condition is not satisfied, the method can default to Block S110 and/or keep monitoring the mobile device movement until a cessation condition is reached (e.g., a timer expires, a threshold number of attempts has been met, etc.).

3.3 Determining Collection Parameters

Block S130 includes determining collection parameters. Block S130 functions to determine features of movement dataset collection that guide the collection of movement dataset(s) (e.g., in accordance with various operating modes of an application executing at least a portion of the method 100). Block S130 can also function to define operating modes or states of data collection and/or processing devices (e.g., a mobile device of the user).

Block S130 can include determining an operating state of the mobile device associated with the user. The mobile device operating state can be an idle state, an in-detection state, a drive state, and any other suitably defined state. Block S130 can include operating the mobile device in one of the plurality of operating states (e.g., idle state, in-detection state, and drive state), preferably based on the activity data but additionally or alternatively having any other suitable basis.

Operating states preferably dictate how GPS data is collected, including data collection frequency, GPS receiver power state, GPS-related application states, and the like. S130 preferably includes collecting GPS data when necessary for vehicle movement analysis purposes, while ceasing to query the GPS receiver when GPS data collection is not necessary (e.g., by powering the GPS receiver off, by operating the GPS receiver in a standby state associated with a slower sampling rate, by querying the GPS receiver at a slower rate, etc.). Alternatively, GPS data may be used for multiple reasons (e.g., for both navigation and accident detection purposes), in these cases, GPS data may be collected whenever desired for any purpose. For example, GPS data may be collected and used for accident detection (even if other sources of PVA data are available) anytime it is already being collected for another purpose.

Mobile device operating states (as they pertain to GPS data collection) may be determined (e.g., set) based on any input data. For example, S130 may include determining GPS data collection parameters differently depending on mobile device battery state (e.g., charge level, charging status), time of day, location, route knowledge (e.g., how much data has been collected about the current route and/or position), GPS signal quality, or any other data.

Block S130 can include Block S132, which includes determining motion data collection parameters corresponding to the operating state of the mobile device of the user. Block S132 functions to determine the data collection parameters that correspond to the determined operating state of the mobile device, and can also function to collect the data according to the data collection parameters thus determined.

In relation to Block S132, the idle state preferably utilizes a minimum of mobile device power. In the idle state, the mobile device preferably monitors collected data (e.g., data collected in accordance with Block S110) for triggers, and upon detection of triggers implements a test (e.g., in accordance with Block S120) to check that driving has started, and in cases wherein driving has started Block S130 preferably includes transitioning the mobile device to operation in the drive state. In the idle state, a geofence is preferably defined about the location of the mobile device (e.g., the location of the. user) such that a trigger is generated when the user enters or exits the geofenced area; the geofence region around the location is preferably sized such that the user crosses the geofence when the user moves substantially (e.g., leaves the location of the geofence such as a workplace, a room, a building, a city block, etc.).

In relation to Block S132, the in-detection state preferably minimizes the amount of processing and/or sensor data used to detect the start of a driving session and further minimizes the number of false positive trip-start detections. In the in-detection state, the mobile device preferably implements one or more tests, which can include executing a user activity model, checking that a geofence has been breached, checking if a user's mobile device has paired with a vehicle computing system (e.g., via Bluetooth), checking if a user's mobile device is connected to a stationary local network (e.g., a home WiFi network, an office WiFi network, etc.), and any other suitable tests. In some variations, if the one or more tests are satisfied, speed of movement data is subsequently collected (e.g., GPS data, inertial sensor data) and used to determine speed of movement. In such variations, if the speed is above a threshold speed (e.g., greater than a walking speed, a biking speed, 40 mph, etc.) and/or the movement is otherwise suitably characteristic of driving motion, then the mobile device is transitioned into the drive state, whereas if the speed is below the threshold speed and/or not otherwise suitably characteristic of driving, the mobile device is transitioned into the idle state.

In relation to Block S132, the drive state (e.g., driving state) preferably includes collecting sensor data without disruption (e.g., for the span of the driving session at suitable frequencies and/or intervals) while minimizing resource consumption (e.g., power consumption, data consumption, etc.). In an example, the drive state includes: in response to detection of a geofence breach, establishing a new geofence having the current location at the center and having a radius proportional to driving speed, such that the number of instances of the geofence being breached is substantially constant per unit time (e.g., the radius can be changed as a function of the driving speed to achieve a substantially constant number of breaches per unit time). In this example and related examples, the existing geofence can be reset in response to detection of the speed of the vehicle decreasing below a threshold value (e.g., 50% of the previously-detected speed at a point in time, a fraction of the maximum speed during the driving session, a percentage decrease in speed of any suitable degree, etc.) in order to regularize the geofence breaching interval as described (e.g., to hold the number of geofence breaches per unit time substantially constant). In another example, in the drive state a persistent notification is pushed to the foreground of the mobile device operating system to prevent termination of the data collection routines (e.g., backgrounding of the application executing data collection).

The drive state can additionally or alternatively include detecting walking (e.g., executing an instance of Block S120) at the end of a driving session, which can trigger transition of the mobile device out of the drive state (e.g., into the idle state, into the in-detection state, etc.). Detecting walking in the drive state can function to reduce resource consumption by accurately and efficiently ceasing data collection outside the bounds of a driving session. In a specific example, the drive state can include ceasing GPS data collection in response to the driving speed (e.g., the user's speed) dropping substantially to zero (e.g., when the user is stopped at an intersection), and continuing to monitor accelerometer output (e.g., from an inertial sensor of the mobile device). In this example, the drive state includes resuming GPS data collection in response to detection of an accelerometer output corresponding to resumption of driving (e.g., when the user accelerates through the intersection after stopping) during the driving session.

3.4 Collecting a Movement Dataset

Block S140 includes: collecting a movement dataset (e.g., a position, velocity, acceleration dataset or PVA dataset, a motion dataset, motion data, movement data, etc.). Block S140 functions to collect movement-related data (e.g., speed, heading, derivatives of velocity including acceleration, jerk, etc.) associated with a vehicle. The vehicle is preferably driven by the user and/or containing the user as the vehicle is driven by a third-party entity, but in alternative variants the vehicle can be otherwise associated with the user (e.g., owned by the user and operated by a third party, registered to the user, driven without the user's knowledge and/or without containing the user, etc.).

Block S140 functions to collect data pertaining to vehicle position, velocity, and/or acceleration for use in other Blocks of the method 100 (e.g., Blocks S120, S150, S160, etc.).

Movement datasets preferably describe at least one of position, velocity, and/or acceleration (PVA) of one or more vehicles, user devices (e.g., user smartphones), users, and/or any other suitable entities, but can additionally or alternatively describe any suitable movement-related characteristic. Movement datasets are preferably sampled at one or more movement sensors indicative of one or more of motion and/or location, which can include one or more of: motion sensors (e.g., multi-axis and/or single-axis accelerometers, gyroscopes, etc.), location sensors (e.g., GPS data collection components, magnetometer, compass, altimeter, etc.), optical sensors, audio sensors, electromagnetic (EM)-related sensors (e.g., radar, lidar, sonar, ultrasound, infrared radiation, magnetic positioning, etc.), environmental sensors (e.g., temperature sensors, altitude sensors, pressure sensors, etc.), biometric sensors, and/or any other suitable sensors.

In a variation, Block S140 can include deriving movement data from collected signal data (e.g., in relation to EM signals transmitted and/or received by mobile devices, vehicles, etc.), such as based on signal quality (e.g., in-vehicle WiFi signal quality; differences in cellular signal quality for mobile devices within a vehicle; Bluetooth signal quality between mobile devices in a vehicle, between mobile devices and a vehicle media system; etc.), received signal strength indicators, Wi-Fi positioning system parameters, signal angle of arrival (e.g., with directional sensors), and/or any other suitable signal-related data. In another variation, Block S140 can include deriving movement data from visual data (e.g., deriving PVA data from video taken by a smartphone's camera and/or vehicle camera; derived from visual markers captured in optical data, such as geographical markers, markers indicated by satellite imagery; etc.) and/or audio data (e.g., deriving motion from Doppler effects captured in data from the smartphone's microphone, etc.). In another variation, Block S140 can include collecting laser rangefinder data sampled using lasers associated with a vehicle. In another variation, Block S140 can include collecting movement data from data collected at the vehicle (e.g., vehicle sensors described herein and/or other suitable vehicle sensors), where the movement data can be received through wired communication (e.g., transmission of data from the vehicle to a mobile device through a wired communication channel, etc.) and/or wireless communication (e.g., transmission of data from the vehicle to a remote vehicle movement determination system through WiFi; transmission of data from the vehicle to the mobile device through Bluetooth, and transmission of the data from the mobile device to the remote vehicle movement determination system; etc.). Movement-related data collected from any suitable components (e.g., different types of mobile devices, etc.) can be processed together, individually, and/or in any suitable manner. However, movement data can be derived from any suitable components in any suitable manner.

Block S140 preferably includes collecting one or more location datasets (e.g., collecting location data), which can include any one or more of: GPS data (e.g., position coordinates, associated time stamps, etc.), indoor positioning system data, local positioning system data, multilateration data, GSM localization data, self-reported positioning, control plane locating data, compass data, magnetometer data, and/or any other suitable location-related data. In an example, GPS data can be leveraged for complete PVA solutions, but can additionally or alternatively include any movement data, such as retrieved using GNSS data (e.g., via GLONASS, Galileo, BeiDou). In another example, proximity sensors associated with mobile phones (e.g., for capacitive proximity sensing; IR-based proximity sensing; etc.) can be used to in determining location of objects (e.g., users within a vehicle). In another example, Block S140 can include collecting a micro-location dataset (e.g., sampled using beacons within and/or mounted to a vehicle). In another example, Block S140 can include collecting a location dataset sampled by a mobile device and indicating the location of the mobile device within the vehicle (e.g., proximal front of vehicle; back of vehicle; etc.). However, collecting location datasets can be performed in any suitable manner.

Block S140 preferably includes collecting one or more motion datasets (e.g., collecting motion data), which can include one or more of: accelerometer data (e.g., single-axis data, multi-axis data), gyroscope data (e.g., single-axis data, multi-axis data), velocity data (e.g., speed, instantaneous velocity, average velocity, change in velocity, velocity variability over time, maximum velocity, minimum velocity, etc.), acceleration data (e.g., instantaneous acceleration, gravitational acceleration, average acceleration, change in acceleration, acceleration variability over time, maximum acceleration, minimum acceleration, etc.), displacement data, orientation data, rotation data, turning data, and/or any other suitable motion-related data. In an example, Block S140 can include collecting a motion dataset for a user entering or exiting a vehicle (e.g., where the motion dataset can be indicative of whether the user is a driver or passenger entering or exiting the vehicle from a driver seat door or passenger seat door; where the motion dataset indicates walking patterns of the user in relation to entering or exiting a vehicle; etc.). However, collecting motion datasets can be performed in any suitable manner.

In relation to Block S140, movement datasets (and/or supplementary datasets) are preferably sampled by components arranged at a mobile device, but can additionally or alternatively be sampled by components associated with (e.g., arranged at, positioned within, mounted to, physically connected to, etc.) any suitable device and/or vehicle. Movement datasets (and/or supplementary datasets) are preferably associated with one or more users (e.g., collected at a mobile device of the user; collected at a mobile device physically proximal a user; stored in association with user accounts for one or more users; movement datasets describing user movement, such as pre-, during, and/or post-driving session; etc.). Further, movement datasets are preferably associated with one or more driving sessions, which can be characterized by characteristics and/or patterns in movement data (e.g., movement data indicating movement that is characteristic of a vehicle) and/or supplementary data (e.g., engine sounds as sensed by a smartphone microphone), and where driving sessions can include movement of, stoppage of, operation control related to, and/or other suitable aspects associated with vehicles. Additionally or alternatively, movement datasets can be associated or independent of any suitable entities.

Block S140 preferably includes collecting movement data continuously from mobile devices in a vehicle (e.g., during vehicle operation), such as in real-time, but can additionally or alternatively include collecting movement data periodically (e.g., at vehicle stoppage events, at predetermined time intervals such as every minute, etc.), and/or in temporal relation (e.g., in response to, etc.) to trigger conditions (e.g., movement-related thresholds; satisfaction or failure of device association conditions; conditions associated with supplementary data; etc.), but collecting movement datasets can be performed at any suitable time and/or frequency. Movement datasets are preferably associated with one or more temporal indicators (e.g., a time period, a time point, etc.) describing when the movement data was collected (e.g., sampled at the corresponding sensor, etc.), determined, and/or otherwise processed. Additionally or alternatively, associated temporal indicators can describe temporal context surrounding the movement indicated by the movement data (e.g., when the movement occurred) but can correspond to any suitable temporal indicator or be time-independent. However, collecting movement data S140 can be performed in any suitable manner.

Block S140 preferably includes collecting GPS data from a GPS receiver of the navigation device. GPS data preferably includes complete position, velocity, time (PVT) solutions, but may additionally or alternatively include any PVA data retrieved using GNSS data (e.g., via GLONASS, Galileo, BeiDou). GPS data is preferably used as a source of both position and velocity data. Velocity data is preferably collected directly from the GPS PVT solution, but may additionally or alternatively be derived from change in position over time (i.e., average velocity). GPS data may additionally or alternatively be used as a source of acceleration data (as derived from change in velocity over time).

Block S140 may additionally or alternatively include collecting PVA data from any other source. For example, S140 may include collecting acceleration data from gyroscopes and/or inertial measurement units (IMU). As another example, S140 may include collecting PVA data using visual data (e.g., deriving velocity from video taken by a smartphone's camera).

Block S140 preferably includes collecting PVA data whenever the mobile device (e.g., navigation device) is in a moving vehicle, but may additionally or alternatively include collecting PVA data at any suitable times and/or ranges of times.

Block S140 preferably also includes collecting PVA data using one or more accelerometers (i.e., collecting accelerometer data). Accelerometer data is preferably used as a source of acceleration data. As with GPS data, accelerometer data is preferably collected based on an operating state of the mobile device (e.g., determined in one or more variations of Block S130), but may additionally or alternatively be collected in any manner.

In variations of Block S140, accelerometer data can be used as a source of position data and/or velocity data. Accelerometer data is preferably used as a source of position data by comparing accelerometer patterns to a map reference with known patterns (e.g., road surface vibration patterns measured by the accelerometer that correlate to a specific stretch of road and therefore a specific geographic location, vibration patterns that correspond to road features of a known physical spacing that can be converted to a velocity, etc.), but can additionally or alternatively utilize dead-reckoning (e.g., double integration of acceleration time series starting from a known position), and any other suitable manner for deriving or estimating position and/or velocity data.

In a variation, Block S140 includes collecting motion data using a second sensor of the mobile device in accordance with motion data collection parameters S142. The motion data collection parameters are preferably determined as described above in relation to Block S130, but can be otherwise suitably determined.

3.5 Generating Analyses

The method 100 can additionally or alternatively include Block S150, which includes generating an analysis of a movement dataset (e.g., collected in Block S140). Block S150 can function to determine characteristics (e.g., an analysis) describing one or more of: vehicles (e.g., PVA-related characteristics; type of vehicle, such as including autonomous properties; etc.), users (e.g., classifications of passenger or driver; driver behavior; passenger behavior; etc.), and/or any other suitable entities.

Determining the vehicle movement characteristic can include any one or more of: combining datasets (e.g., processing a plurality of movement datasets associated with a plurality of mobile devices to extract a set of movement features to input into a vehicle movement model; etc.), and/or otherwise processing datasets (e.g., using processing techniques described herein, etc.) to improve accuracy and/or other suitable aspects associated with vehicle movement characteristic (e.g., processing speed, storage and/or retrieval associated with the vehicle movement characteristic, etc.).

Block S150 can additionally or alternatively include Block S155, which includes processing a dataset (e.g., a movement dataset, a user activity dataset, etc.). Block S155 functions to process data collected in other Blocks of the method 100 into a form suitable for determining user activity, analyzing vehicle movement, and/or any other suitable data analysis. Processing datasets (e.g., in Block S155 and/or any other suitable portion of the method 100) can include any one or more of: extracting features (e.g., from a plurality of datasets collected at a plurality of mobile devices, etc.), performing pattern recognition on data (e.g., comparing current movement datasets to reference movement datasets), fusing data from multiple sources, combination of values (e.g., averaging values, etc.), compression, conversion (e.g., digital-to-analog conversion, analog-to-digital conversion), performing statistical estimation on data (e.g. ordinary least squares regression, non-negative least squares regression, principal components analysis, ridge regression, etc.), wave modulation, normalization, updating, ranking, weighting, validating, filtering (e.g., for baseline correction, data cropping, etc.), noise reduction, smoothing, filling (e.g., gap filling), aligning, model fitting, binning, windowing, clipping, transformations, mathematical operations (e.g., derivatives, moving averages, summing, subtracting, multiplying, dividing, etc.), multiplexing, demultiplexing, interpolating, extrapolating, clustering, image processing techniques (e.g., image filtering, image transformations, histograms, structural analysis, shape analysis, object tracking, motion analysis, feature detection, object detection, stitching, thresholding, image adjustments, etc.), other signal processing operations, other image processing operations, visualizing, and/or any other suitable processing operations. In an example, Block S155 can include associating different data (e.g., different data collected at different mobile devices, different data types, same data type, etc.) based on a common and/or overlapping temporal indicator (e.g., time point, time window, time period, etc.), which can enable data collected from multiple sources during a common temporal indicator to be processed and/or analyzed together.

Block S155 is preferably performed at a vehicle movement determination system (e.g., remote computing system, etc.), but can additionally or alternatively be performed at mobile devices and/or at any suitable components at any suitable time and frequency (e.g., in response to collecting a threshold amount and/or threshold types of data, etc.). However, processing at least one of a movement dataset and a supplementary dataset can be performed in any suitable manner.

3.6 Transmitting Communications

The method 100 can additionally or alternatively include Block S160, which includes transmitting a communication based on the analysis (e.g., generated in Block S150). Block S160 functions to notify an entity of a result and/or consequence of the analysis.

In an example, Block S160 can include reporting an accident to an insurance-related entity in response to an analysis of the motion data indicative that an accident has occurred. Reporting the accident (e.g., collision) can include providing a first notice of loss (FNOL) to the insurance-related entity (e.g., retail insurer, insurance underwriter, policy holder, policy underwriter, policy issuer, etc.). An FNOL can be provided automatically (e.g., without user input at the mobile device), semi-automatically (e.g., wherein data pertaining to the collision is automatically entered into an FNOL form and final authorization to send is provided by the user at the mobile device).

In additional or alternative examples, Block S160 can include any suitable traffic-related communications analogous to those described in U.S. application Ser. No. 16/166, 895, entitled "Method and System for Vehicular-Related Communications" and filed 22 Oct. 2018, which is incorporated herein in its entirety by this reference.

However, Block S160 can additionally or alternatively include transmitting any suitable communication for any suitable purpose.

In a variation, Block S160 includes Block S162, which includes transmitting a notification to a remote entity based on at least one of the extracted vehicle movement characteristics exceeding a threshold value of a vehicle motion parameter. Vehicle motion parameters can include speed, lateral acceleration, and any other suitable parameters of vehicle motion.

3.7 Further Specific Examples

In a first specific example, the method for monitoring vehicle motion using a mobile device associated with a user includes detecting that the user has breached a first geofence using at least one of a motion sensor and a location sensor of the mobile device. The first geofence in this example defines a first origin and a first radius. Detecting that the user has breached the first geofence and the subsequent portions of the method are by an application executing on the mobile device, wherein the application is operable between an idle state, an in-detection state, and a drive state. This example of the method further includes transitioning the application into the in-detection state in response to detecting that the user has breached the first geofence, and determining, at the application in the in-detection state, that the user is in a driving activity state based on a user activity model. This example of the method further includes transitioning the application into the drive state (e.g., at a time point) in response to determining that the user is in the driving activity state. Operating the application in the drive state includes: collecting a movement dataset using at least one of the motion sensor and the location sensor, determining a second origin and a second radius based on the movement dataset, and regenerating the first geofence at the second origin and with the second radius. This example of the method further includes analyzing the movement dataset to generate a set of vehicle movement characteristics, and transmitting the set of vehicle movement characteristics to a database and storing the set of vehicle movement characteristics in association with the user (e.g., and the time point).

In a second specific example, the method for monitoring vehicle motion using a mobile device associated with a user is performed by an application executing on the mobile device, wherein the application is operable between an idle state, an in-detection state, and a drive state. In this example, the method includes receiving a trigger at the application operating in the idle state, and, in response to the trigger, operating the application in the in-detection state. Operating the application in the in-detection state includes: collecting activity data using at least one of a motion sensor and a location sensor of the mobile device, determining a user activity state based on the activity data according to a user activity model, and based on the user activity state, operating the application in one of the idle state and the drive state. In this example operating the application in the drive state includes collecting a movement dataset using at least one of the motion sensor and the location sensor, and analyzing the movement dataset to generate a set of vehicle movement characteristics. In this example, operating the application in the idle state includes resetting a trigger condition, wherein satisfaction of the trigger condition generates the trigger (e.g., which is received when operating the application in the idle state).

The system(s) and method(s) of the preferred embodiment and variations thereof can be embodied and/or implemented at least in part as a machine configured to receive a computer-readable medium storing computer-readable instructions. The instructions are preferably executed by computer-executable components (e.g., integrated with the system, making up the system itself, etc.). The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and/or method blocks.

As a person skilled in the art will recognize from the previous detailed description and from the figures and claims, modifications and changes can be made to the preferred embodiments of the invention without departing from the scope of this invention defined in the following claims.

What is claimed is:

1. A method for monitoring vehicle motion using a mobile device associated with a user, comprising:
    at an application executing on the mobile device in an idle state, detecting that the user has breached a first geofence using at least one of a motion sensor and a location sensor of the mobile device, wherein the first geofence defines a first origin and a first radius, wherein the application is operable between the idle state, an in-detection state, and a drive state;
    transitioning the application into the in-detection state in response to detecting that the user has breached the first geofence;
    determining, at the application in the in-detection state, that the user is in a driving activity state based on a user activity model;
    transitioning the application into the drive state at a time point in response to determining that the user is in the driving activity state, wherein the drive state comprises:
        collecting a movement dataset using at least one of the motion sensor and the location sensor,
        determining a second origin and a second radius based on the movement dataset, and
        regenerating the first geofence at the second origin and with the second radius;
    analyzing the movement dataset to generate a set of vehicle movement characteristics; and
    transmitting the set of vehicle movement characteristics to a database and storing the set of vehicle movement characteristics in association with the user and the time point.

2. The method of claim 1, wherein the motion sensor comprises an accelerometer, and wherein the location sensor comprises a GPS sensor.

3. The method of claim 1, further comprising collecting supplementary data at an auxiliary sensor of the mobile device, and determining that the user is in the driving activity state based on the user activity model in combination with the supplementary data.

4. The method of claim 3, wherein the supplementary data comprises vehicular audio data, and wherein the auxiliary sensor comprises a microphone that is inactive in the idle state of the application, active in the in-detection state of the application, and inactive in the driving state of the application.

5. The method of claim 1, wherein determining the second radius based on the movement dataset comprises calculating the second radius based on a vehicle speed extracted from the movement dataset.

6. A method for monitoring vehicle motion using a mobile device associated with a user, comprising:
    receiving a trigger at an application executing on the mobile device in an idle state, wherein the application is operable between the idle state, an in-detection state, and a drive state;
    in response to the trigger, operating the application in the in-detection state, comprising:
        collecting activity data using at least one of a motion sensor and a location sensor of the mobile device,
        determining a user activity state based on the activity data according to a user activity model,
        based on the user activity state, operating the application in one of the idle state and the drive state;
    in response to operating the application in the drive state:
        collecting a movement dataset using at least one of the motion sensor and the location sensor, and
        analyzing the movement dataset to generate a set of vehicle movement characteristics; and
    in response to operating the application in the idle state:
        resetting a trigger condition, wherein satisfaction of the trigger condition generates the trigger.

7. The method of claim 6, wherein determining the user activity state according to the user activity model comprises:
    accumulating a series of activity updates extracted from the movement dataset;

determining that the user activity state is a driving state based on a comparison between the series of activity updates and a predetermined pattern of activity updates associated with driving; and wherein
operating the application in one of the idle state and the drive state comprises operating the application in the drive state.

8. The method of claim 6, wherein the user activity model comprises a tree-based model defining a set of linked nodes, wherein each node of the linked nodes comprises a binary test condition, and wherein determining the user activity state comprises evaluating the binary test condition of each node along a first path traversing the set of linked nodes.

9. The method of claim 8, wherein evaluating the binary test condition of each node along the first path is associated with a corresponding resource cost, and wherein the corresponding resource cost of each node is greater than a resource cost of a preceding node along the first path.

10. The method of claim 9, wherein the corresponding resource cost of each node comprises an energy requirement associated with evaluating the binary test condition using a processor of the mobile device.

11. The method of claim 6, wherein receiving the trigger comprises detecting that the user has breached a first geofence defining a first origin and a first radius, and wherein resetting the trigger condition comprises regenerating the first geofence with a second origin coincident with a location of the mobile device and a second radius.

12. The method of claim 6, wherein determining the user activity state according to the user activity model comprises determining that the user activity state is a non-driving state and wherein operating the application in one of the idle state and the drive state comprises operating the application in the idle state.

13. The method of claim 12, wherein determining that the user activity state is a non-driving state comprises determining that a short-range radio of the mobile device is unconnected to a vehicle computing system.

14. The method of claim 6, wherein operating the application in the in-detection state further comprises:
collecting supplementary data at an auxiliary sensor of the mobile device, and
determining that the user is in the driving activity state based on the user activity model in combination with the supplementary data.

15. The method of claim 14, wherein the supplementary data comprises vehicular audio data, and wherein the auxiliary sensor comprises a microphone that is inactive in the idle state of the application, active in the in-detection state of the application, and inactive in the driving state of the application.

16. The method of claim 6, wherein operating the application in the drive state further comprises:
detecting a cessation condition, and
transitioning the application into the idle state in response to detecting the cessation condition, wherein the cessation condition comprises a speed value extracted from the movement dataset falling below a threshold value continuously over a predetermined time period.

17. The method of claim 6, wherein operating the application in the drive state further comprises:
determining a geofence defining an origin at an instantaneous location of the mobile device and a radius, wherein the radius is proportional to an instantaneous speed of the mobile device;
detecting a breach of the geofence and an elapsed time between determining the geofence and detecting the breach;
in response to the elapsed time exceeding a threshold time, transitioning the application into the idle state; and
in response to the elapsed time falling below threshold time, regenerating the geofence wherein the origin is defined at a new instantaneous location of the mobile device at the elapsed time.

18. The method of claim 6, wherein collecting the movement dataset comprises collecting location data using the location sensor and motion data using the motion sensor, and wherein operating the application in the drive state further comprises:
ceasing collecting location data at the location sensor in response to determining that a vehicle speed is below a threshold value while continuing collecting motion data at the motion sensor, and
resuming collecting location data in response to determining that the vehicle speed exceeds the threshold value.

19. The method of claim 6, further comprising determining that a vehicle in which the mobile device is arranged has been involved in a collision, based on the set of vehicle motion characteristics.

20. The method of claim 19, further comprising transmitting a notification to an insurance-related entity in response to determining that the vehicle in which the mobile device is arranged has been involved in the collision using a cellular radio of the mobile device.

* * * * *